(12) United States Patent
Bristol et al.

(10) Patent No.: US 8,540,274 B2
(45) Date of Patent: Sep. 24, 2013

(54) VEHICLE AIRBAG SUPPORT ASSEMBLY

(75) Inventors: Michael Bristol, Algonac, MI (US); Chad Kwolek, Hartland, MI (US)

(73) Assignee: Nissan North America, Inc., Franklin, TN (US)

( * ) Notice: Subject to any disclaimer, the term of this patent is extended or adjusted under 35 U.S.C. 154(b) by 4 days.

(21) Appl. No.: 13/335,099

(22) Filed: Dec. 22, 2011

(65) Prior Publication Data

US 2013/0161929 A1 Jun. 27, 2013

(51) Int. Cl.
*B60R 21/16* (2006.01)

(52) U.S. Cl.
USPC ........................................ 280/728.2

(58) Field of Classification Search
USPC .......... 280/728.1, 728.2, 730.1, 732; 296/72, 296/193.02; 403/66–72, 187, 190–192, 230, 403/234–236
See application file for complete search history.

(56) References Cited

U.S. PATENT DOCUMENTS

| | | | |
|---|---|---|---|
| 5,037,130 A | 8/1991 | Okuyama | |
| 5,092,627 A | 3/1992 | Igawa | |
| 5,096,223 A | 3/1992 | Tekelly et al. | |
| 5,533,747 A | 7/1996 | Rose | |
| 5,700,028 A | 12/1997 | Logan et al. | |
| 5,700,029 A | 12/1997 | Enders | |
| 5,851,023 A * | 12/1998 | Nagata et al. | 280/728.3 |
| 6,173,988 B1 | 1/2001 | Igawa | |
| 6,176,511 B1 | 1/2001 | Adkisson et al. | |
| 6,286,858 B1 | 9/2001 | Shepherd et al. | |
| 6,296,277 B1 | 10/2001 | Bittinger et al. | |
| 6,312,008 B1 | 11/2001 | Neag | |
| 6,338,499 B2 * | 1/2002 | Ueno et al. | 280/732 |
| 6,406,056 B2 * | 6/2002 | Yokota | 280/728.2 |
| 6,435,548 B2 | 8/2002 | Suzuki et al. | |
| 6,692,017 B2 * | 2/2004 | Taoka et al. | 280/728.2 |
| 7,188,861 B2 | 3/2007 | Ono | |

(Continued)

FOREIGN PATENT DOCUMENTS

JP 05-286400 A 11/1993
JP 2005-035541 A 2/2005

(Continued)

OTHER PUBLICATIONS

Excerpt from The 2011 Nissan Titan Service Manual (5 pages).

(Continued)

*Primary Examiner* — Joseph Rocca
*Assistant Examiner* — Robert A Coker
(74) *Attorney, Agent, or Firm* — Global IP Counselors, LLP

(57) ABSTRACT

A vehicle airbag support assembly comprises a vehicle cross-car beam and an airbag support structure. The vehicle cross-car beam includes rearward and forward surfaces facing rearward and forward directions of a vehicle. The airbag support structure includes a mounting portion, and elongated extension portion and a support portion. The mounting portion is fixedly coupled to the rearward surface of the vehicle cross-car beam. The elongated extension portion includes a first end fixedly coupled to the mounting portion and a second end spaced from the first end such that the first end is situated closer to the rearward surface than the forward surface and the second end extends beyond the forward surface. The support portion supports an airbag device and is fixedly coupled to the second end of the extension portion such that the support portion is situated closer to the forward surface than the rearward surface and is cantilevered.

20 Claims, 15 Drawing Sheets

(56) References Cited

U.S. PATENT DOCUMENTS

| | | | |
|---|---|---|---|
| 7,229,095 B2 * | 6/2007 | Nishijima et al. | 280/732 |
| 7,290,788 B2 | 11/2007 | Tomford et al. | |
| 7,293,795 B2 | 11/2007 | Kong | |
| 7,350,805 B2 | 4/2008 | Kumagai | |
| 7,431,326 B2 | 10/2008 | Tsujimoto et al. | |
| 7,686,326 B2 | 3/2010 | Kim et al. | |
| 7,695,006 B2 | 4/2010 | Choi | |
| 7,712,777 B2 | 5/2010 | Breed | |
| 7,770,914 B2 | 8/2010 | Dumbrique | |
| 7,938,444 B2 | 5/2011 | Williams et al. | |
| 2004/0080144 A1 * | 4/2004 | Enders | 280/728.2 |
| 2004/0094986 A1 | 5/2004 | Landvik et al. | |
| 2004/0197134 A1 * | 10/2004 | Wang et al. | 403/234 |
| 2005/0140120 A1 * | 6/2005 | Seo | 280/728.2 |
| 2007/0228698 A1 * | 10/2007 | Enders | 280/730.1 |
| 2008/0007032 A1 | 1/2008 | Sadek et al. | |
| 2009/0284038 A1 * | 11/2009 | Sato | 296/72 |
| 2011/0115200 A1 | 5/2011 | Choi et al. | |

FOREIGN PATENT DOCUMENTS

| | | |
|---|---|---|
| JP | 2008-110737 A | 5/2008 |
| JP | 2011-031777 A | 2/2011 |
| WO | WO-03/051682 A1 | 6/2003 |

OTHER PUBLICATIONS

Excerpt from The 2011 Nissan Versa Service Manual (5 pages).
Excerpt from The 2012 Nissan NV2500 Service Manual (5 pages).

\* cited by examiner

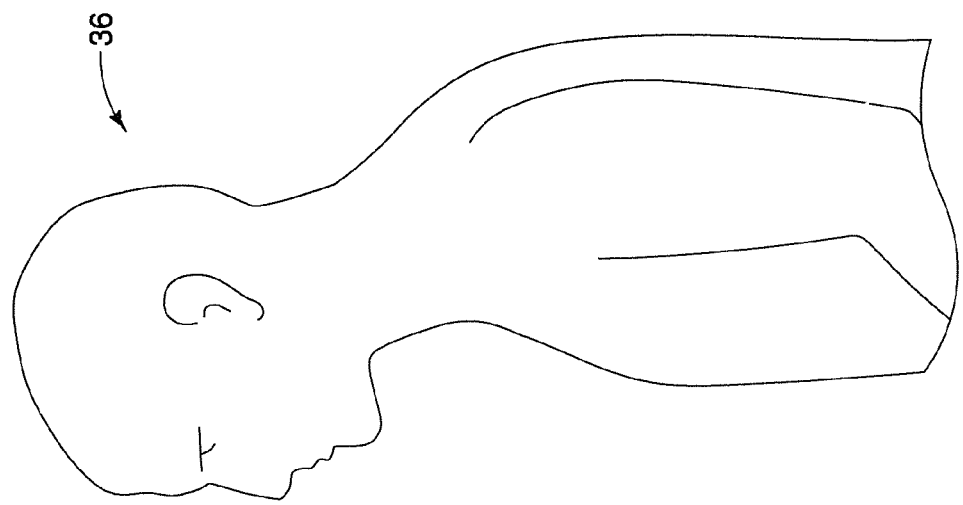
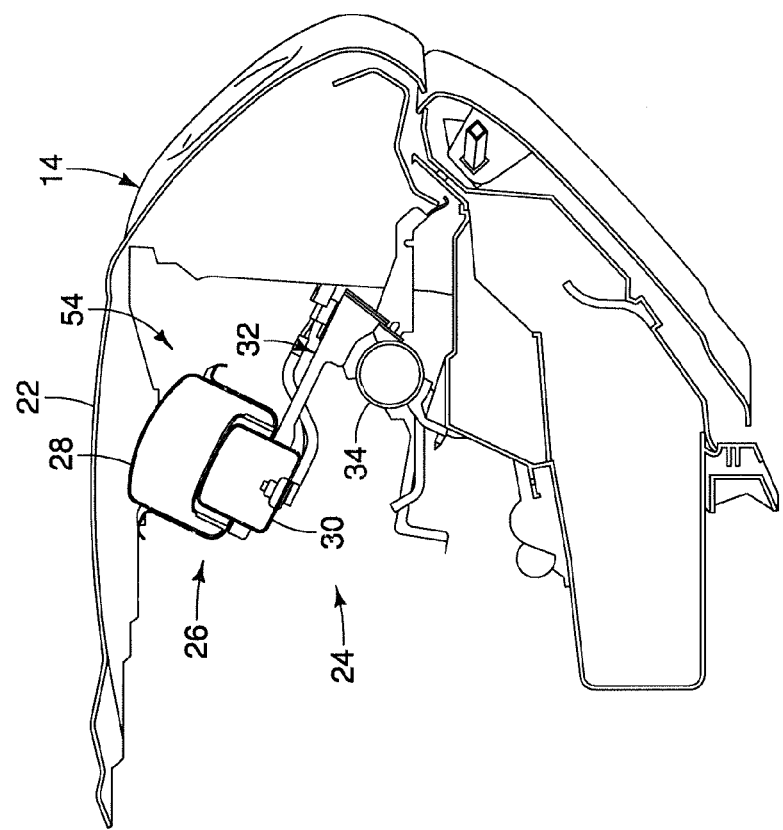
FIG. 3

VEHICLE AIRBAG SUPPORT ASSEMBLY

CROSS-REFERENCE TO RELATED APPLICATION

Related subject matter is disclosed in U.S. patent application Ser. No. 13/012,498, filed on Jan. 24, 2011, the entire contents of which are hereby incorporated herein by reference.

BACKGROUND OF THE INVENTION

1. Field of the Invention

The present invention relates to a vehicle airbag support assembly. More specifically, the present invention relates to a vehicle airbag support assembly that is configured to position a vehicle airbag in a desired location, such as in a high-mounted location behind a vehicle dashboard.

2. Background Information

Various portions of vehicles are continuously being re-designed and modified to increase performance, reduce cost or weight, and/or comply with regulatory standards. For example, airbags are typically installed to protect passengers in the event of an impact. Airbags are operably connected to an airbag deployment system which typically includes a triggering device. The triggering device detects rapid changes in acceleration due to an impact event. Upon the detection of an impact event above a prescribed threshold, the triggering device sends a signal to the airbag deployment system instructing the system to deploy the airbag(s) in a vehicle.

SUMMARY

In view of the state of the known technology, one aspect of the present invention is directed to a vehicle airbag support assembly comprising a vehicle cross-car beam and an airbag support structure. The vehicle cross-car beam includes a rearward surface facing a rearward direction of a vehicle and a forward surface facing a forward direction of the vehicle. The airbag support structure includes a mounting portion, and elongated extension portion and a support portion. The mounting portion is fixedly coupled to the rearward surface of the vehicle cross-car beam. The elongated extension portion includes a first end fixedly coupled to the mounting portion and a second end spaced from the first end such that the first end is situated closer to the rearward surface than the forward surface and the second end of the extension portion extends beyond the forward surface of the vehicle cross-car beam. The support portion supports an airbag device and is fixedly coupled to the second end of the extension portion such that the support portion is situated closer to the forward surface than the rearward surface and is cantilevered with respect to the mounting portion.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 3 is a cross-sectional view of the vehicle dashboard, the airbag and the airbag support assembly showing an undeployed airbag;

DETAILED DESCRIPTION OF EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
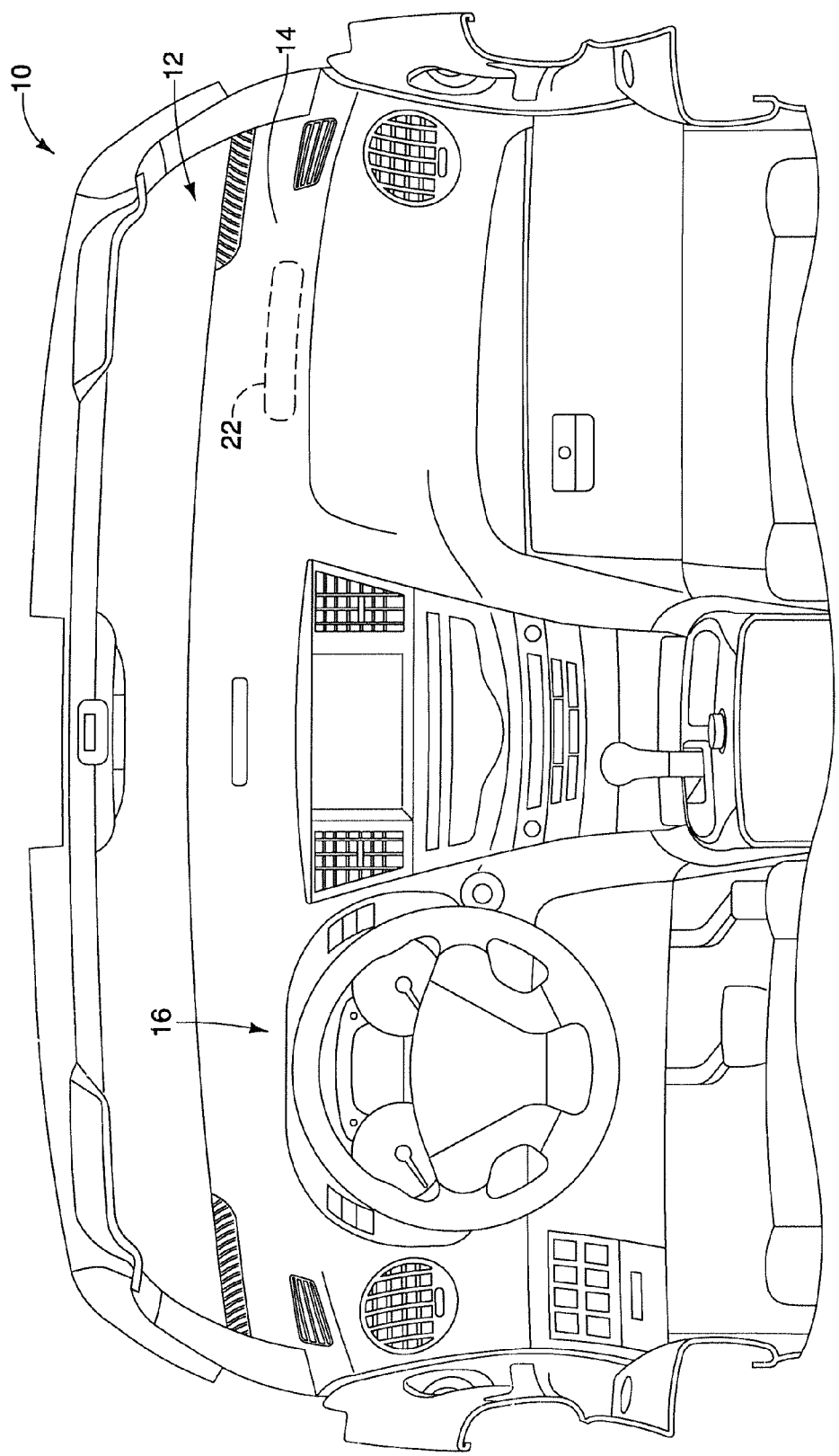
FIG. 1 is a perspective view of a vehicle passenger compartment.
Figure 2:
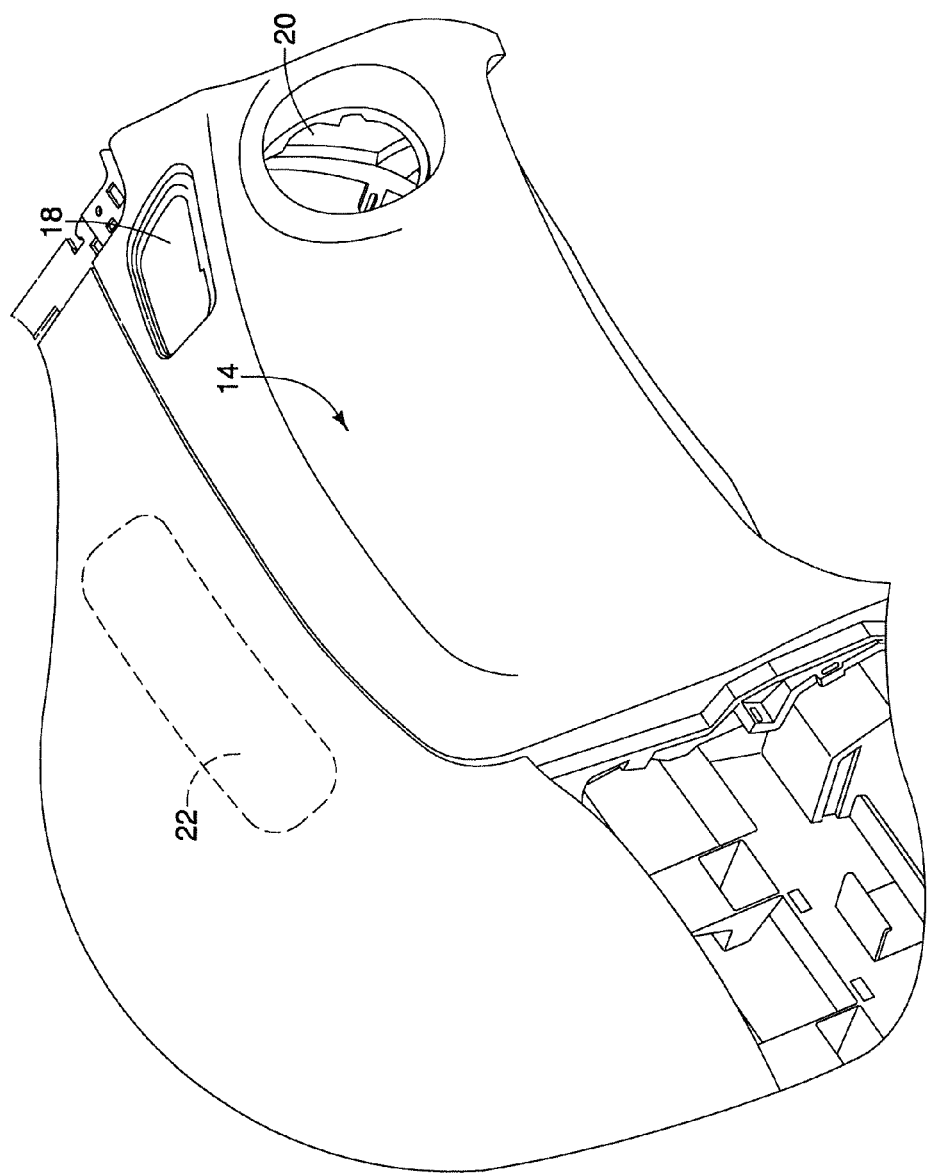
FIG. 2 is a detailed perspective view of a portion of a vehicle dashboard showing an airbag region.

Referring initially to FIGS. 1 and 2 a vehicle 10 has a passenger compartment 12 and a dashboard 14 generally at the front of the passenger compartment 12. The dashboard 14 typically includes an instrument panel 16, and a plurality of grill openings 18 and 20 which can accommodate vent outlets, speakers and so on. As shown in FIG. 2, an airbag region 22 associated with a high-mounted airbag is identified on the dashboard 14. Those skilled in the art will appreciate that the dashboard 14 can be formed to maintain an overall appearance as shown in FIG. 2, which conceals the presence of the high-mounted airbag for aesthetic purposes. Alternatively, the dashboard 14 can define an airbag cover panel or conceal a hidden airbag cover panel that facilitates deployment of the high-mounted airbag.

Figure 4:
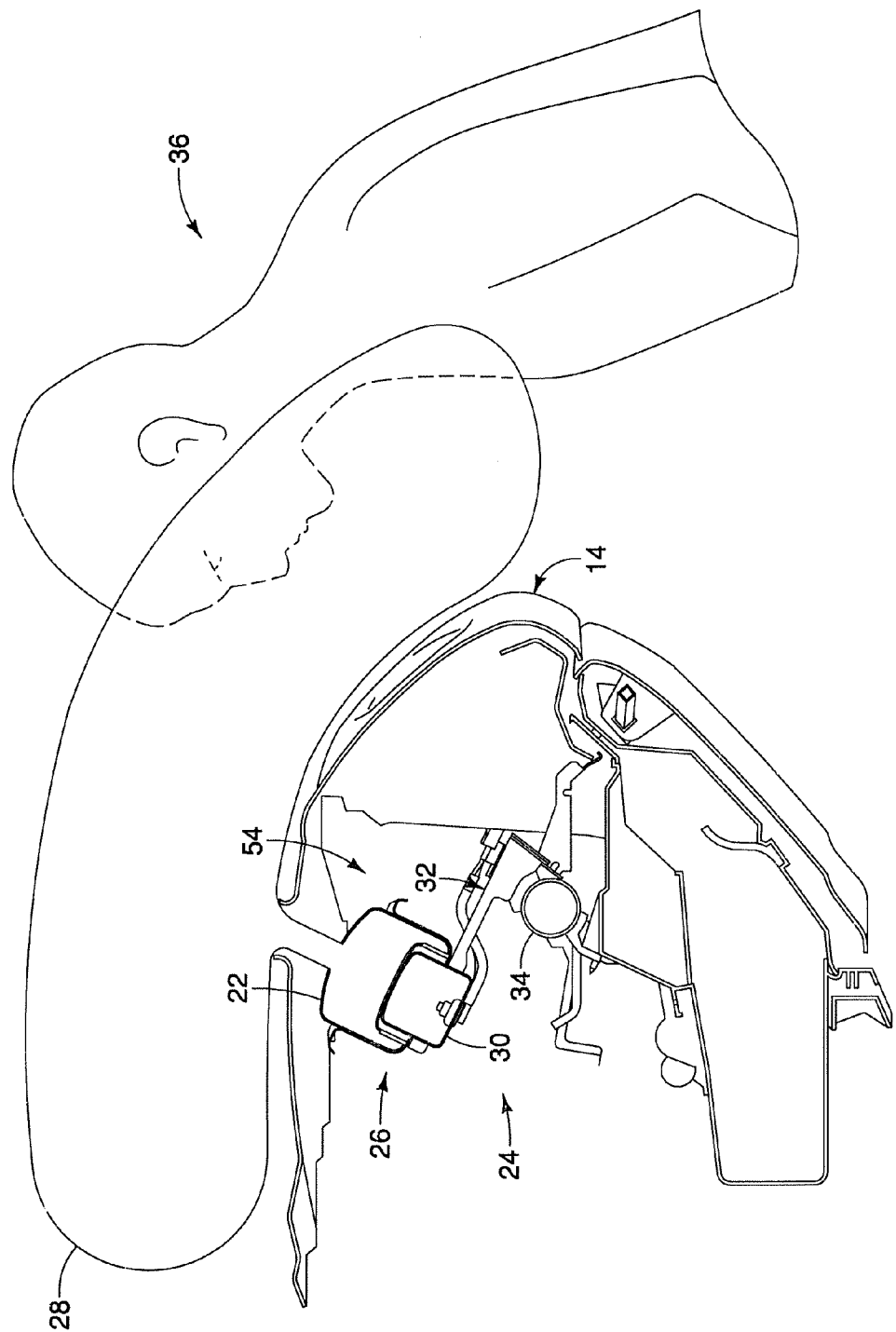
FIG. 4 is a cross-sectional view of the vehicle dashboard, the airbag and the airbag support assembly showing a deployed airbag.
Figure 5:
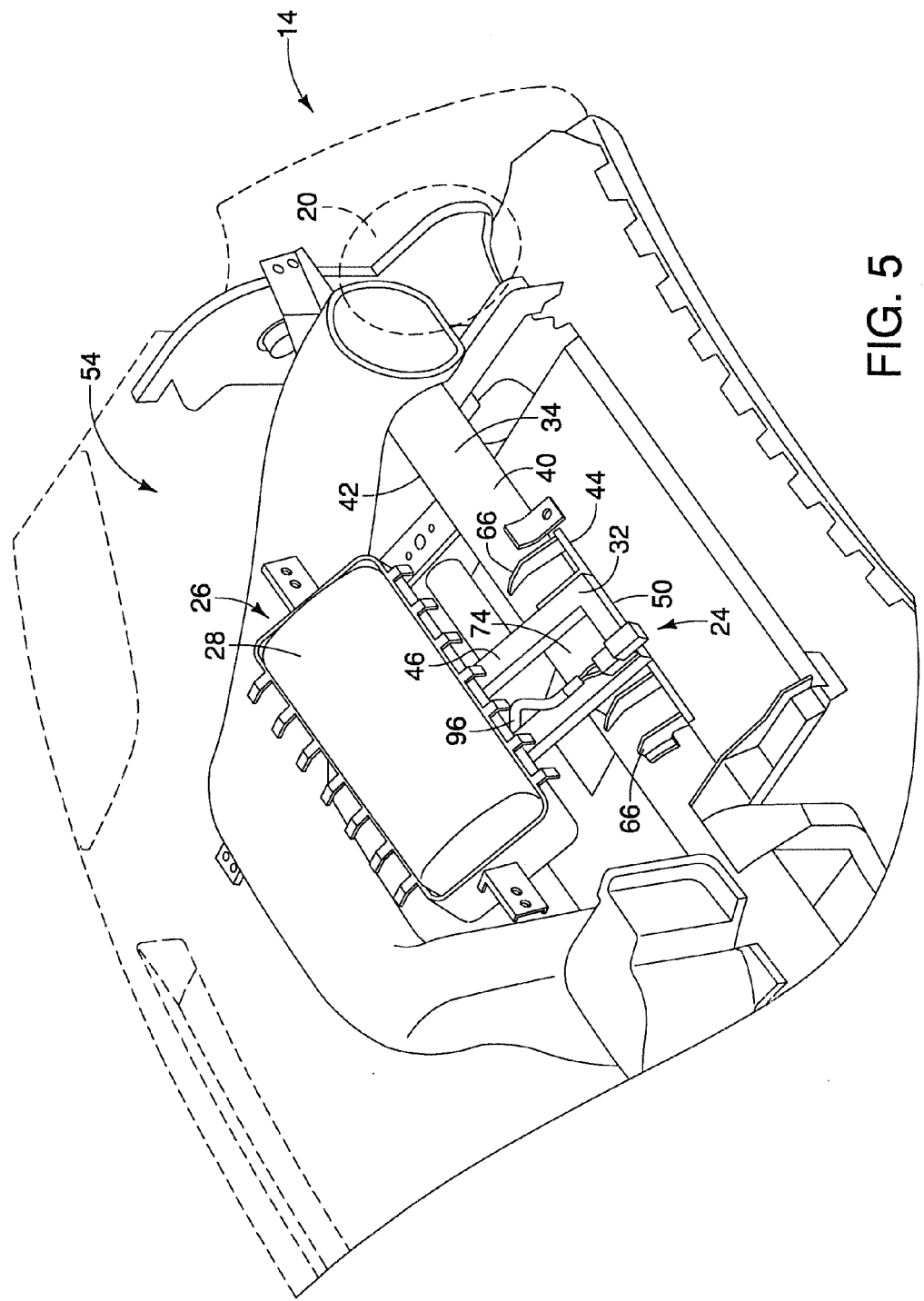
FIG. 5 is a rear perspective view of the airbag and the airbag support assembly.
Figure 6:
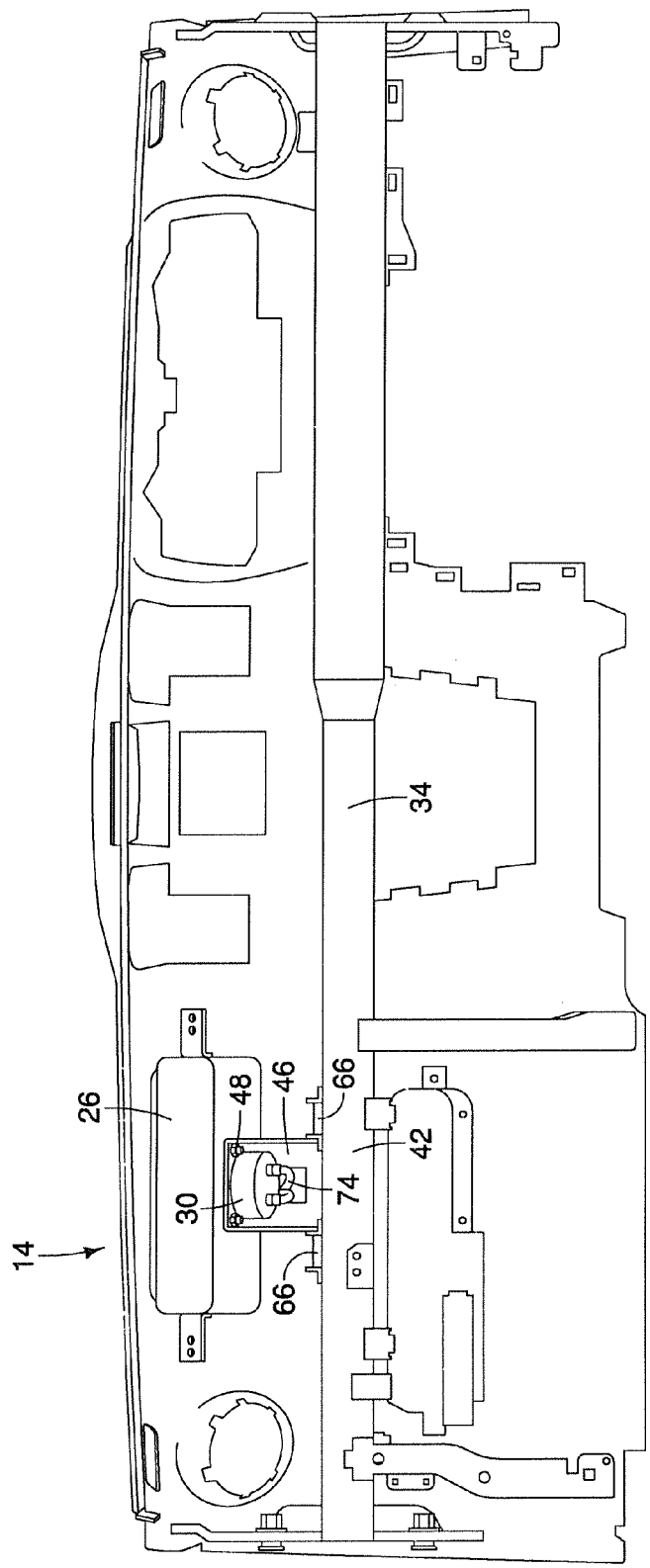
FIG. 6 is a front elevational view of the airbag and the airbag support assembly.
Figure 7:
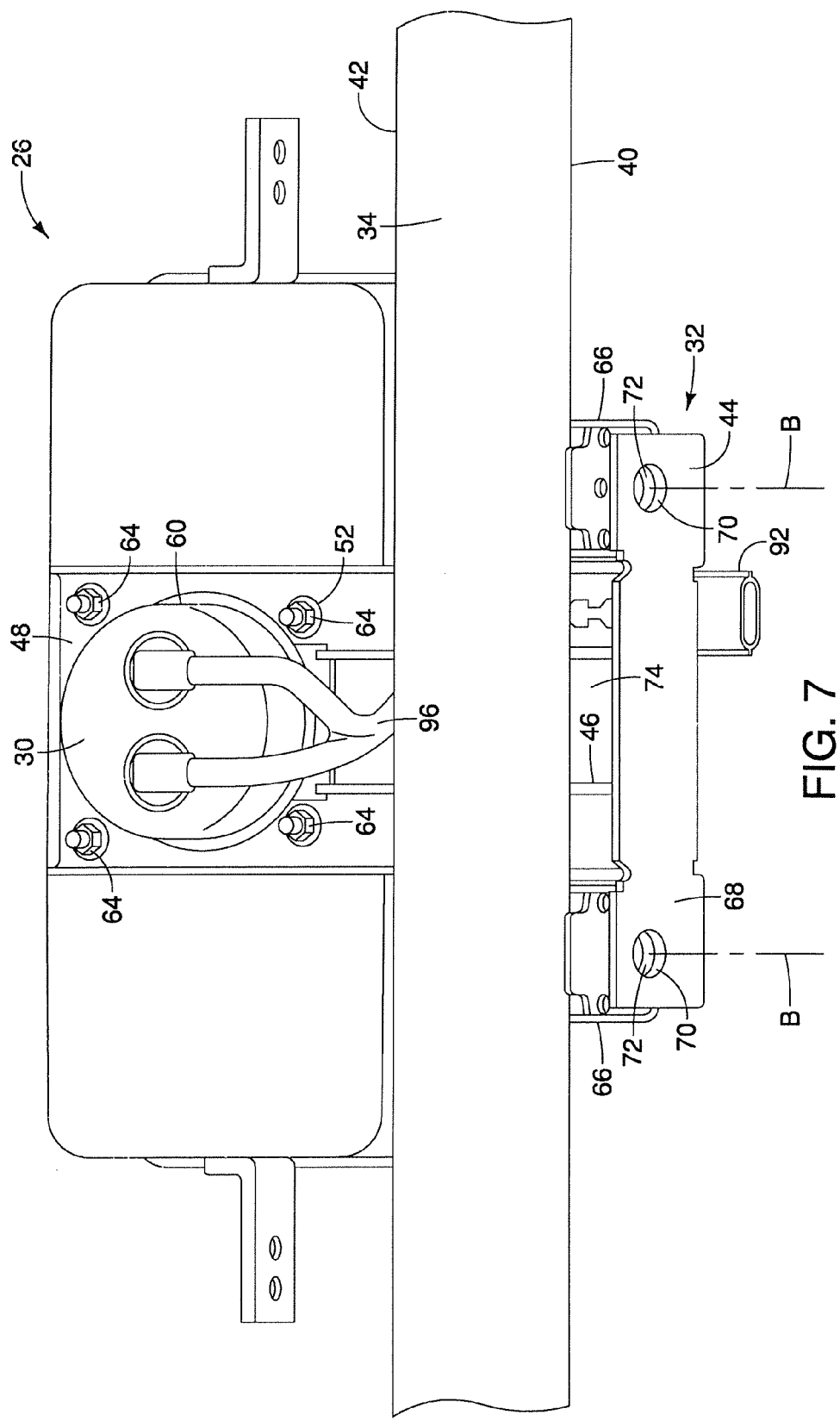
FIG. 7 is a bottom view of the airbag and the airbag support assembly.

As shown in more detail in FIGS. 3 and 4, a vehicle airbag support assembly 24 is disposed behind the airbag region 22. In this example, the vehicle airbag support assembly 24 supports a vehicle airbag device 26 that houses an airbag 28 and an airbag inflator 30. The vehicle airbag support assembly 24 further includes an airbag support structure 32 that secures the vehicle airbag device 26 to a structural support member, such as a vehicle cross-car beam 34. The components of the vehicle airbag support assembly 24 and the vehicle cross-car beam 34 can be made of metal or any other suitable material. The vehicle cross-car beam 34 is secured to the vehicle 10 by welds, bolts or other suitable securing members. The vehicle cross-car beam 34 can be situated adjacent to or behind the dashboard 14 as shown in FIGS. 3 and 4. However, a vehicle airbag support assembly 24 according to the present invention can be located in various other locations within a particular vehicle.

As shown in FIG. 4, when an impact event is detected, the airbag inflator 30 is detonated in order to inflate the airbag 28. The airbag 28 forcibly penetrates the dashboard 14 in the airbag region 22 (e.g., separates the dashboard 14 along a frangible seam) and the airbag 28 deploys into the passenger compartment 12 to provide a cushioning surface for a vehicle occupant 36.

As shown in FIGS. 5-10, the vehicle cross-car beam 34 has a rearward surface 40 facing in a rearward direction of the vehicle 10 and a forward surface 42 facing in a forward direction of the vehicle 10. The airbag support structure 32 includes a mounting portion 44, an elongated extension portion 46 and a support portion 48. The mounting portion 44 is fixedly coupled to the rearward surface 40 of the vehicle cross-car beam 34. The elongated extension portion 46 has a first end 50 fixedly coupled to the mounting portion 44 and a second end 52 spaced from the first end 50. As shown, with the airbag support structure 32 in an installed position, the first end 50 of the elongated extension portion 46 is situated at or on the rearward surface 40 of the vehicle cross-car beam 34, and the second end 52 of the elongated extension portion 46 extends beyond the forward surface 42 of the vehicle cross-car beam 34. Moreover, the elongated extension portion 46 further extends in an upward direction of the vehicle 10 when the mounting portion 44 is fixedly coupled to the rearward surface 40 of the vehicle cross-car beam 34. Thus, the elongated extension portion 46 enables positioning of the airbag 28.

As further shown, the vehicle cross-car beam 34 extends within a cavity 54 defined by the dashboard 14 such that the vehicle cross-car beam 34 positions the mounting portion 44 in the cavity 54. In this example, the entire vehicle airbag support assembly 24 and the vehicle airbag device 26 are positioned within the cavity 54. Also, the support portion 48 supports the airbag device 26. That is, the support portion 48 is fixedly coupled to the second end 52 of the elongated extension portion 46 such that the support portion 48 is situated beyond the forward surface 42 of the vehicle cross-car beam 34 and is cantilevered with respect to the mounting portion 44. In this arrangement, the airbag device 26 is thus in a high-mounted configuration. The support portion 48 in this example has a planar support surface 56 that is configured to support the airbag device 26. The support portion 48 also defines an opening 58 that is configured to receive a portion 60 of the airbag device 26 therein. The opening 58 has a central axis A that extends at an acute angle θ (shown in FIG. 8) relative to a horizontal plane L toward the rearward direction of the vehicle 10. The central axis A also extends perpendicular or substantially perpendicular to the direction in which the elongated extension portion 46 extends (i.e., normal to the support surface 56). Accordingly, the support portion 48 and the support surface 56 position and support the airbag device 26 such that a direction of deployment of the airbag device 26 (e.g., along the central axis A) is normal (i.e., perpendicular or substantially perpendicular) to the support surface 48 and toward the rearward direction of the vehicle 10. The support portion 48 can further define a plurality of openings 62. Each of the plurality of openings 62 can receive a fastener 64, such as a screw, rivet, bolt and so on, which secures the airbag device 26 to the support portion 48. Thus, the elongated extension portion 46 of the airbag support structure 32 positions the airbag 28 car-forward of the vehicle cross-car beam 34 within the cavity, which enables the airbag device 26 to meet low risk deployment (LRD) regulatory standards.

As can be appreciated from the above, the mounting portion 44 can be fixedly coupled to the rearward surface 40 of the vehicle cross-car beam 34 in any suitable manner. In this example, a plurality of mounting brackets 66 couple the mounting portion 44 to the vehicle cross-car beam 34, and each of the plurality of mounting brackets 66 at least partially conform to a radial contour of the vehicle cross-car beam 34. The mounting brackets 66 can be secured to the vehicle cross-car beam 34 using any suitable fasteners, such as welds, screws, rivets, bolts and so on. Thus, each of the mounting brackets 66 contacts the rearward surface 40 of the vehicle cross-car beam 34 as shown. Alternatively, the mounting brackets 66 can be combined into a single centrally-located mounting bracket as desired to couple the mounting portion 44 to the vehicle cross-car beam 34.

As further shown, the mounting portion 44 includes a mounting structure 68 that defines a plurality of mounting apertures 70. In this example, the mounting apertures 70 are disposed on opposite sides of the elongated extension portion 46, but can be at any suitable location. Also, each of the mounting apertures 70 has a respective center axis B (shown in FIG. 10) that projects toward the second end 52 of the elongated extension portion 46. The mounting structure 68 can therefore be coupled to the mounting brackets 66 by any suitable fasteners 72 such as screws, bolts, rivets and so on. Furthermore, as mentioned above, the airbag device 26 is arranged in a high-mounted configuration in the illustrated embodiment. However, a different airbag support structure 32 having an elongated extension portion 46 of a different length can be used to mount the airbag device 26 at a higher or lower position within the cavity 54.

As further shown in FIGS. 5-7 and 9, and in more detail in FIGS. 11-14, the elongated extension portion 46 defines a space 74 that divides the elongated extension portion 46 into a first extension arm 76 and a second extension arm 78. The space 74 extends longitudinally along a central section of the elongated extension portion 46. The first and second extension arms 76 and 78 each have a respective U-shaped cross-section as viewed in a longitudinal direction of the elongated extension portion 46 (see, for example, FIG. 14). This U-shaped cross-section provides enhanced structural support across the cantilevered section of the vehicle airbag support assembly 24. The elongated extension portion 46 also includes at least two planar base flanges (support flanges) 80 and 82 that are located proximate to the mounting portion 44 and have curved edges 84 and 86, respectively. The base flanges (support flanges) 80 and 82 extend from an upper surface of the elongated extension portion 46 toward the vehicle cross-car beam 34. The shape of the curved edges 84 and 86 can correspond or substantially correspond to the outer shape (or radial contour) of the vehicle cross-car beam 34. For example, the radii of the curved edges 84 and 86 can correspond to or substantially correspond to the outer radius of the vehicle cross-car beam 34. Accordingly, the base flanges (support flanges) 80 and 82 can provide structural support without contacting the vehicle cross-car beam 34 due to the clearance provided by the curved edges 84 and 86. However, the base flanges (support flanges) 80 and 82 can instead rest on an upper surface 88 of the vehicle cross-car beam 34, such that the vehicle cross-car beam 34 supports the base flanges (support flanges) 80 and 82. Thus, the upper surface 88 of the vehicle cross-car beam 34 can optionally assist in directly supporting the elongated extension portion 46.

Figure 8:
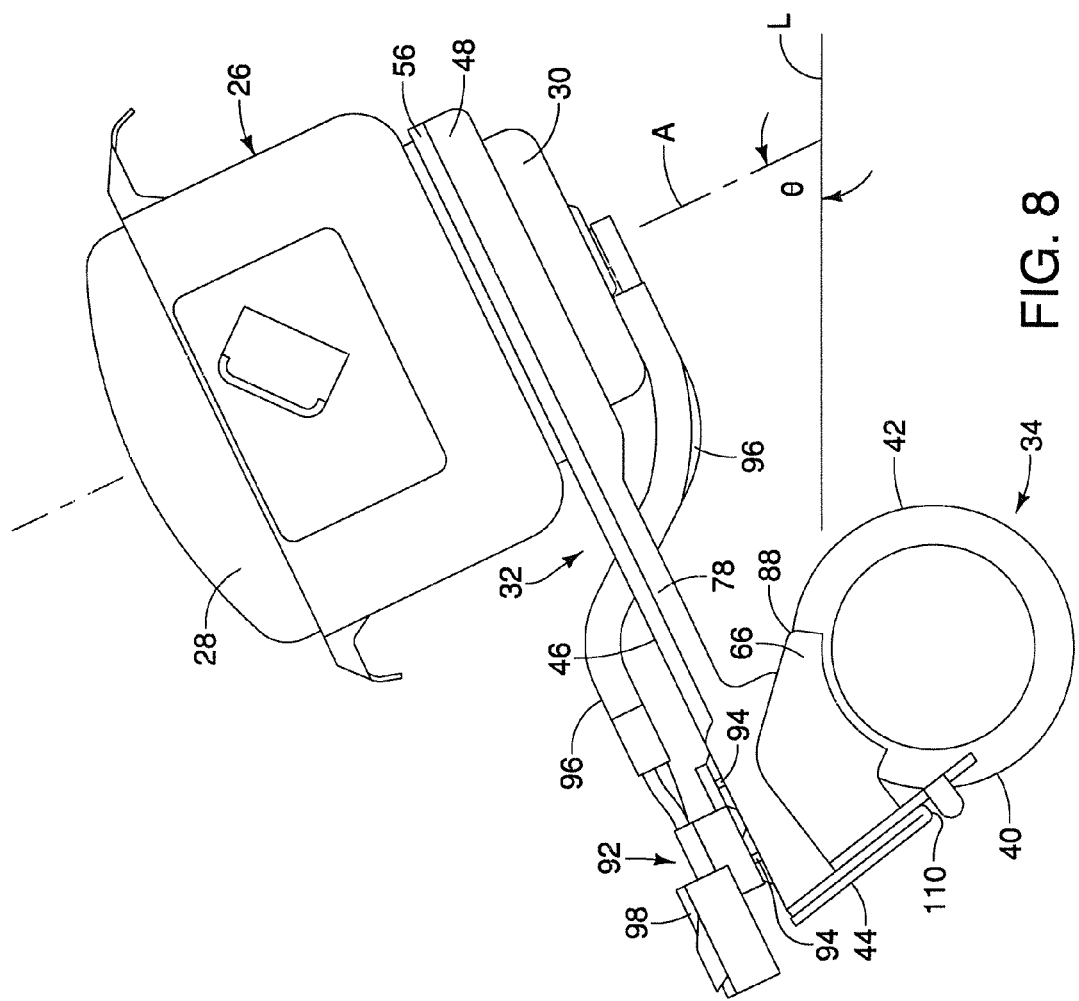
FIG. 8 is a side elevational view of the airbag and the airbag support assembly.
Figure 9:
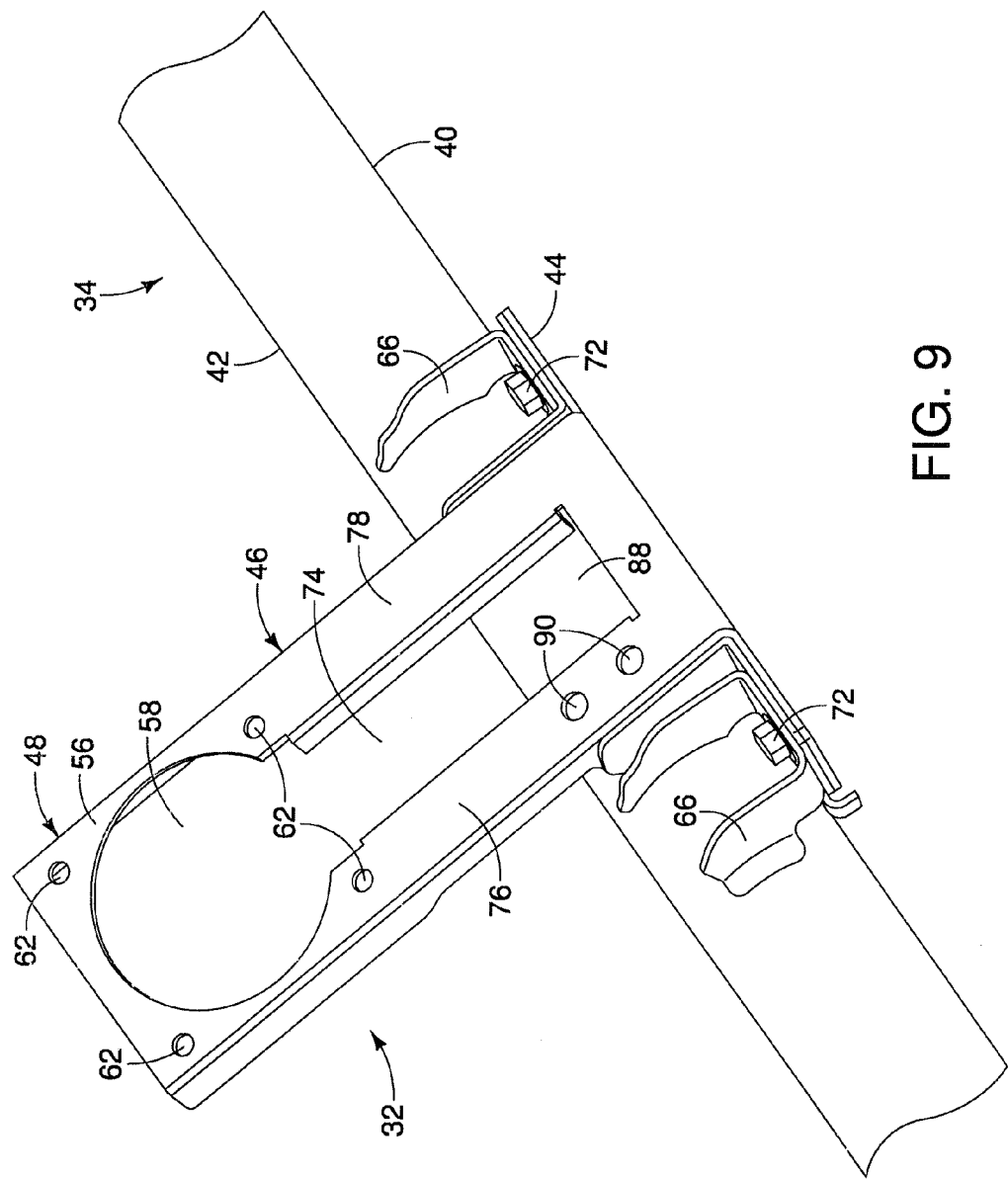
FIG. 9 is a rear perspective view of the airbag support assembly with the airbag removed.
Figure 10:
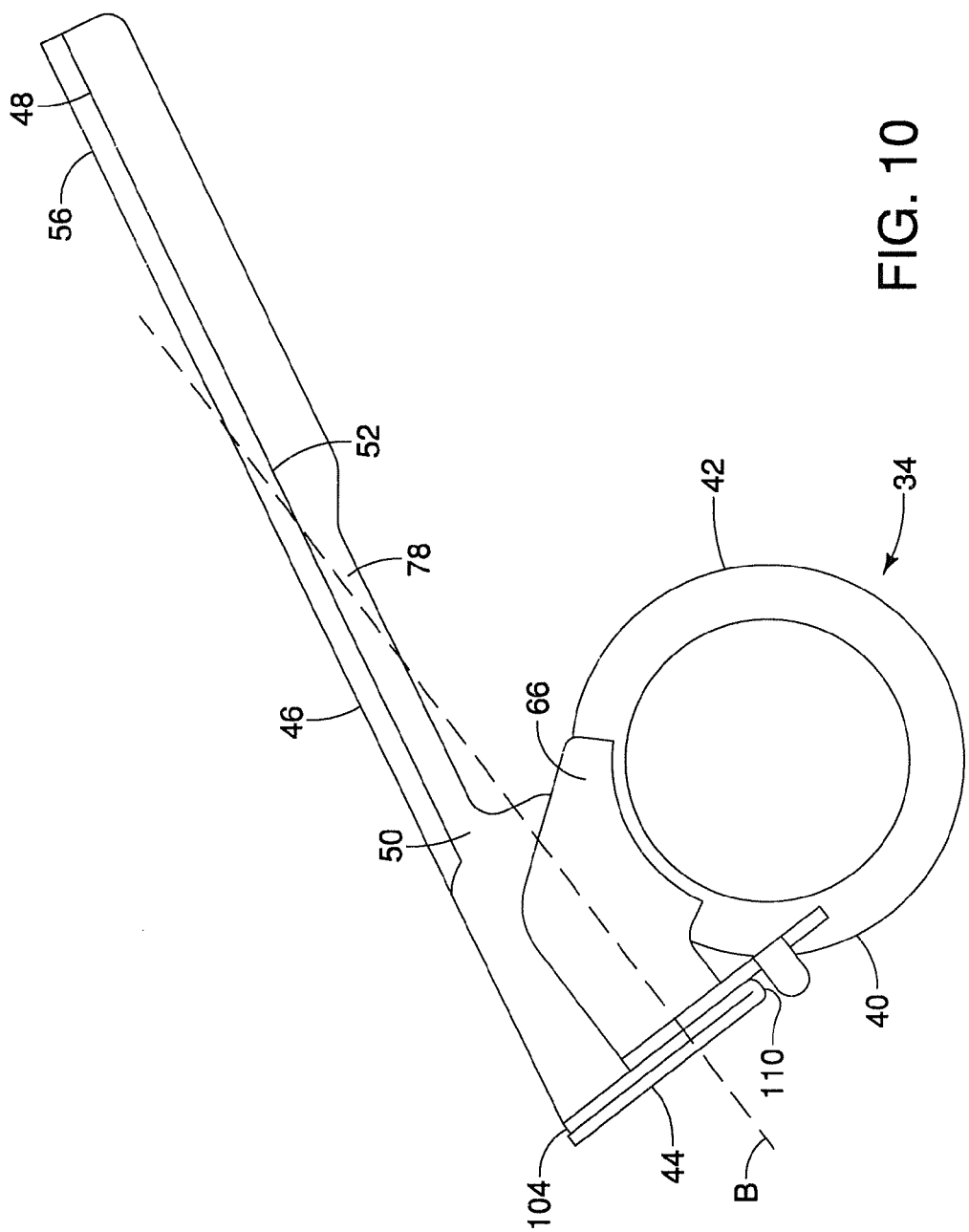
FIG. 10 is a side elevational view of the airbag support assembly with the airbag removed.
Figure 11:
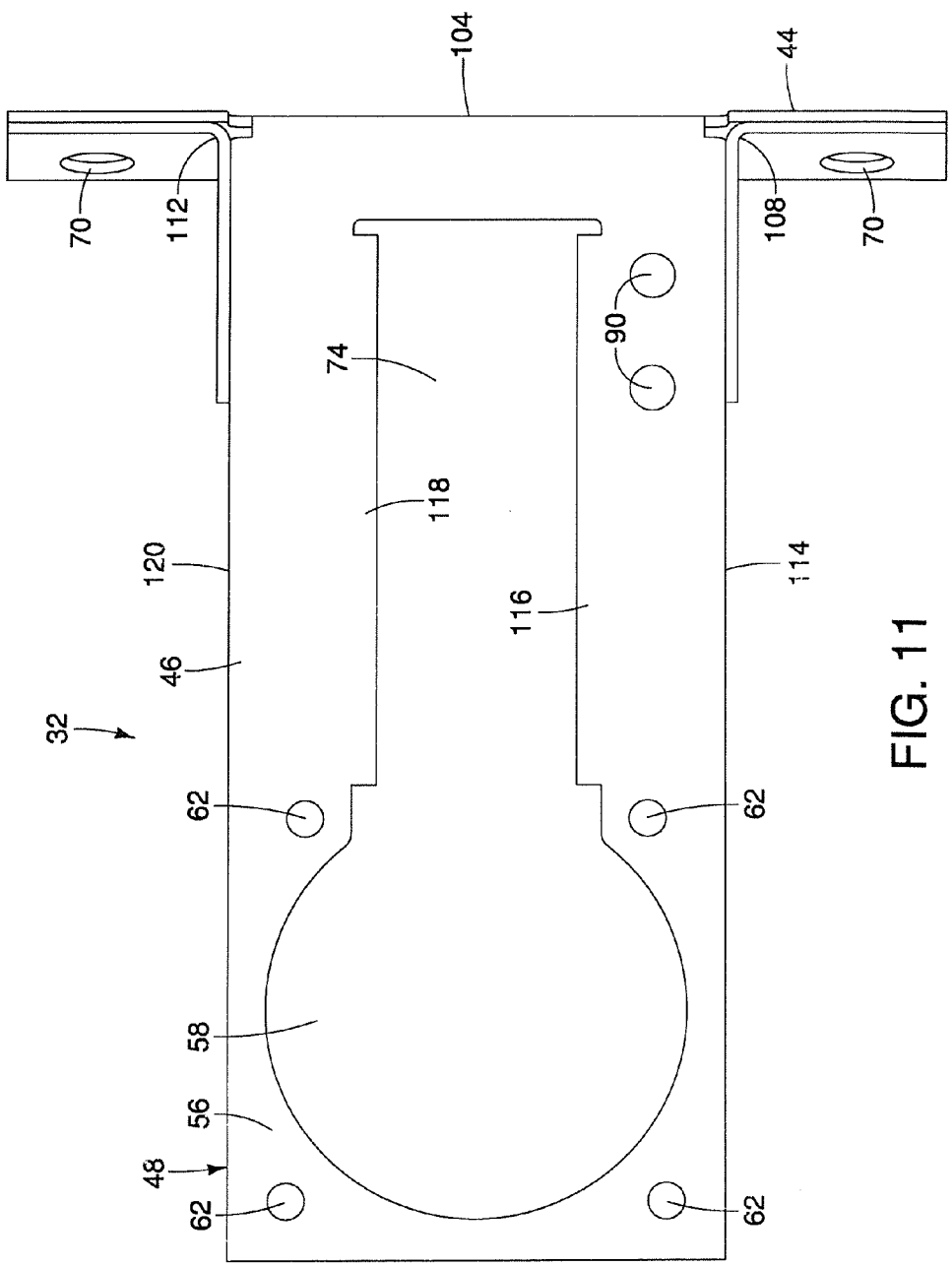
FIG. 11 is a plan view of an airbag support structure component of the airbag support assembly.
Figure 12:
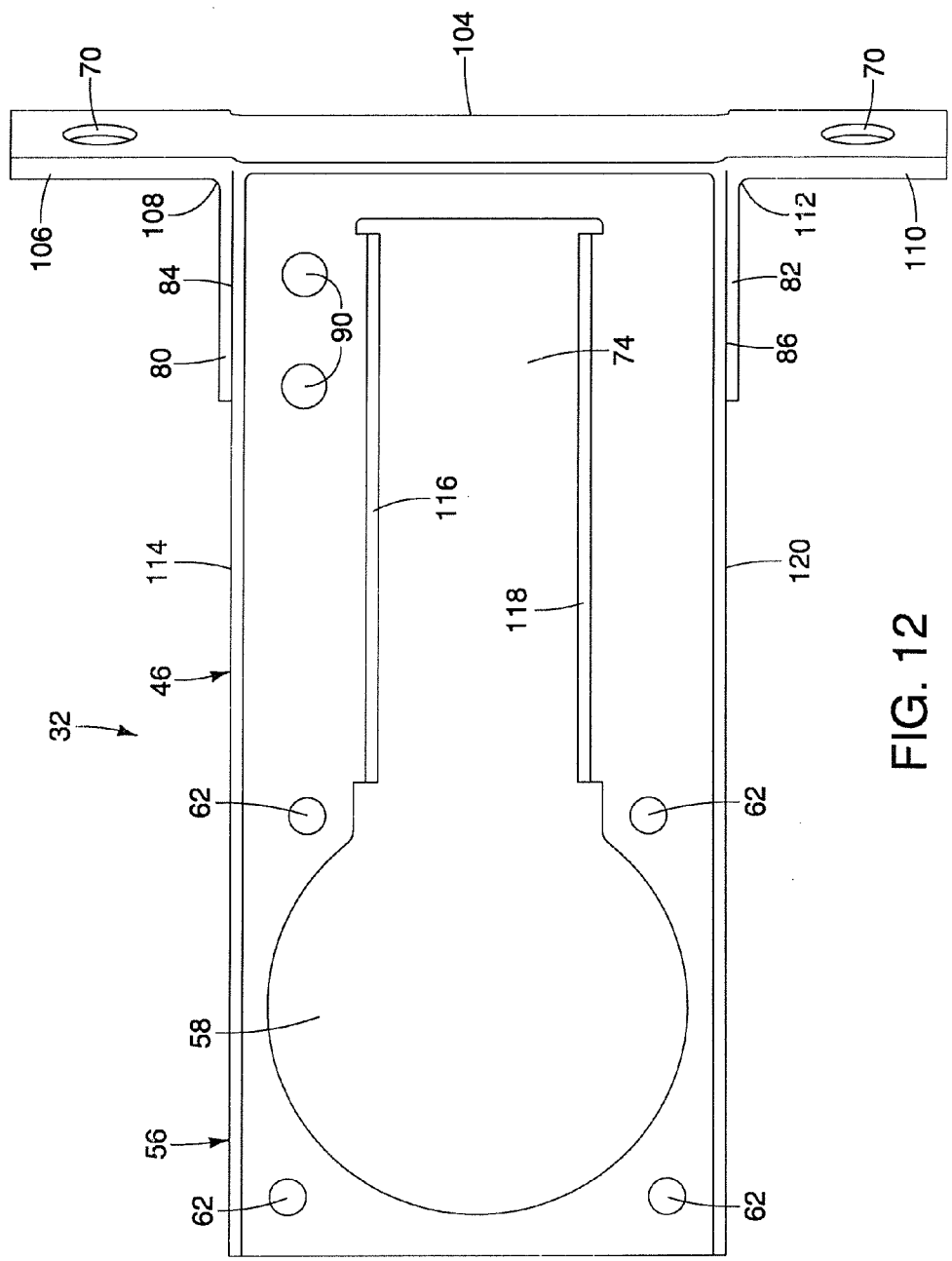
FIG. 12 is a bottom view of the airbag support structure component.
Figure 13:
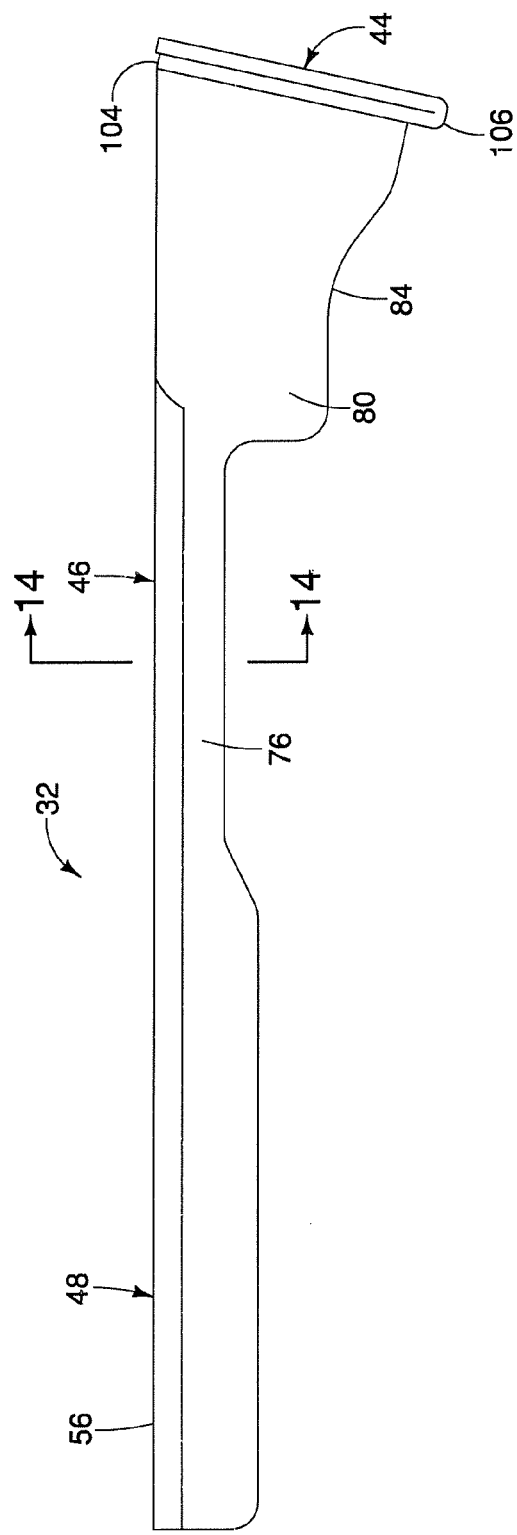
FIG. 13 is a side elevational view of the airbag support structure component.
Figure 14:
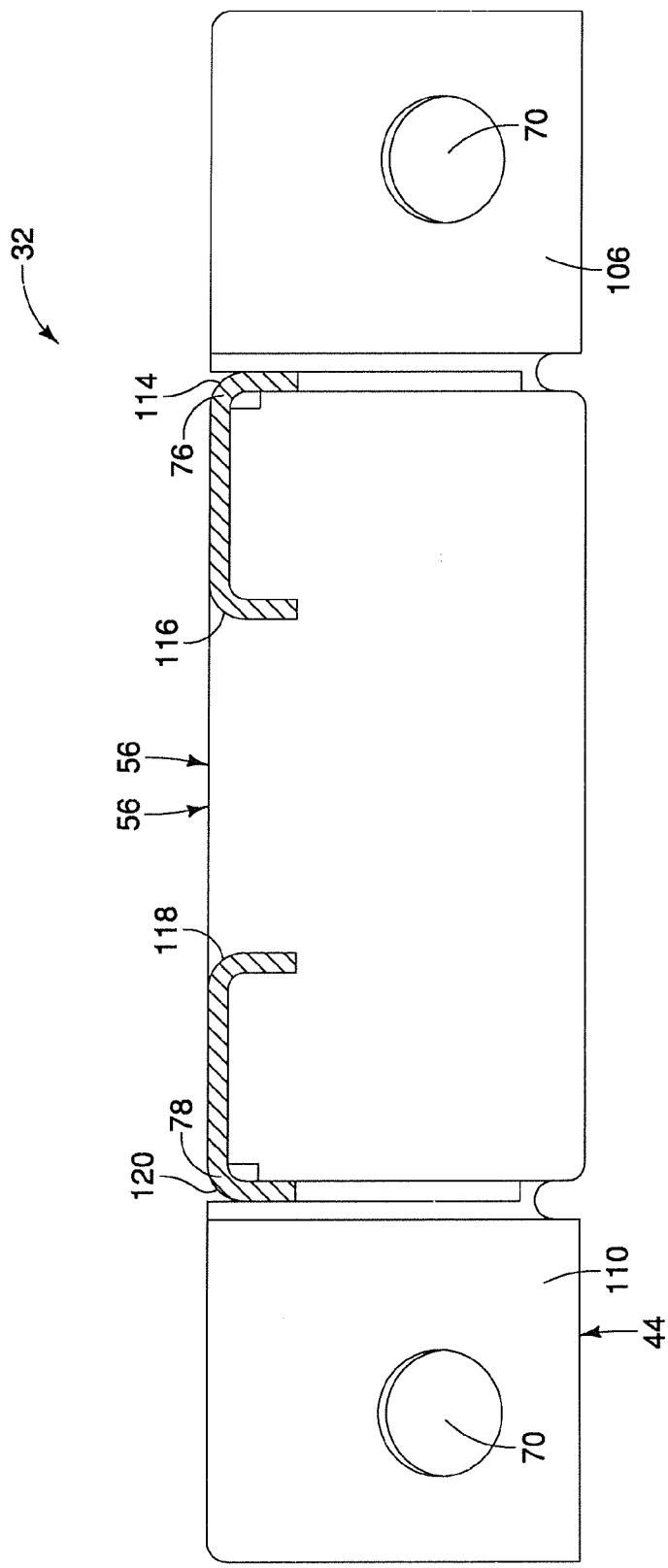
FIG. 14 is a front cross-sectional view of the airbag support structure component.

In addition, the elongated extension portion 46 defines at least one harness aperture 90 that is configured to receive a wiring harness mounting structure 92 (see, for example, FIG. 8). The wiring harness mounting structure 92 can be coupled to the elongated extension portion 46 by fasteners 94 such as screws, bolts, rivets and so on, that are received in the harness apertures 86. The wiring harness mounting structure 92 is coupled to one end of a wiring harness 96 to which is attached an electrical coupler 98. The other end of the wiring harness 96 is connected to the airbag inflator 30. Thus, a controller (not shown) provides signals via the wiring harness 96 to the airbag inflator 30 to control the airbag inflator 30 to deploy the airbag 28 at the appropriate time, such as during an impact event.

Figure 15:
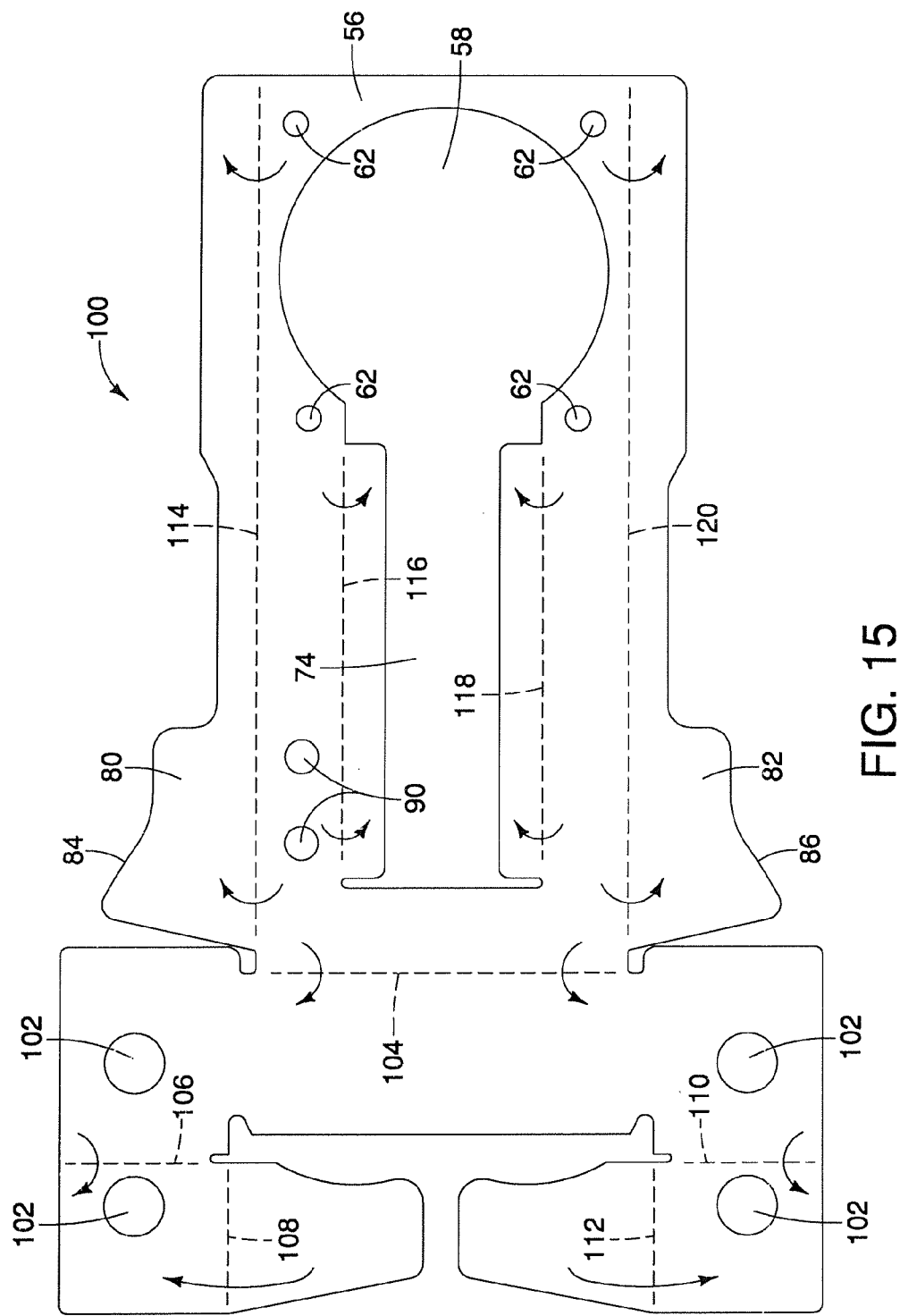
FIG. 15 is a plan view of patterned preform material that can be formed into the airbag support structure component.

It should also be noted that the airbag support structure 32 can be directly manufactured (e.g., forged or molded) in its illustrated shape, or can be made from a preform (or blank) that is ultimately formed into the airbag support structure 32. For example, as shown in FIG. 15, a preform 100 having a prescribed shape can be provided from which to manufacture the airbag support structure 32. The preform 100 can be made of metal or any other suitable material that has sufficient rigidity but that can also be folded at prescribed locations. In an unfolded state, the preform 100 defines certain features of the airbag support structure 32, such as the opening 58, the plurality of openings 62, the space 74, the planar base flanges (support flanges) 80 and 82 having curved edges 84 and 86, respectively, the harness apertures 90, and holes 102 which define the mounting apertures 70.

Accordingly, the preform 100 can be folded along prescribed fold lines (as indicated by arrows in FIG. 15) to form the shape of airbag support structure 32. In this example, the perform 100 is folded along fold lines 104, 106, 108, 110 and 112 to form the mounting portion 44. As the preform 110 is formed along fold lines 106 and 110, the openings 102 align with each other to define the mounting apertures 70. In addition, the perform 100 is folded along fold lines 114, 116, 118 and 120 to define the first and second extension arms 76 and 78 of the elongated extension portion 46. Naturally, the airbag support structure 32 can be formed in any other suitable manner, such as by assembling separate components together to form the airbag support structure 32 as desired.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle airbag support assembly comprising:
    a vehicle cross-car beam having a rearward surface facing a rearward direction of a vehicle and a forward surface facing a forward direction of the vehicle; and
    an airbag support structure comprising:
        a mounting portion including a plurality of lateral extensions fixedly coupled to the rearward surface of the vehicle cross-car beam;
        an elongated extension portion having a first end fixedly coupled to the mounting portion and a second end spaced from the first end such that the first end is situated closer to the rearward surface than the forward surface and the second end of the extension portion extends beyond the forward surface of the vehicle cross-car beam, and the lateral extensions extend toward opposite directions outwardly beyond a width of the elongated extension portion from opposite sides of the elongated extension portion; and
        a support portion configured to support an airbag device, the support portion being fixedly coupled to the second end of the extension portion such that the support portion is situated closer to the forward surface than the rearward surface and is cantilevered with respect to the mounting portion.

2. The vehicle airbag support assembly according to claim 1, wherein
    the mounting portion includes a mounting structure that defines a mounting aperture having a center axis that projects toward the second end of the elongated extension portion.

3. The vehicle airbag support assembly according to claim 1, wherein
    the elongated extension portion defines a space that divides the elongated extension portion into first and second extension arms.

4. The vehicle airbag support assembly according to claim 3, wherein
    the space extends in a longitudinal direction of the elongated extension portion to span the mounting portion and the support portion along a central section of the elongated extension portion.

5. The vehicle airbag support assembly according to claim 3, wherein
the first and second extension arms each have a respective U-shaped cross-section as viewed in a longitudinal direction of the elongated extension portion.

6. The vehicle airbag support assembly according to claim 1, wherein
the elongated extension portion includes at least two planar base flanges that extend from an upper surface of the elongated extension portion toward the vehicle cross-car beam and have curved edges that at least partially correspond to a radial contour of the vehicle cross-car beam.

7. The vehicle airbag support assembly according to claim 1, wherein
the elongated extension portion extends substantially perpendicular to a plane of the mounting portion.

8. The vehicle airbag support assembly according to claim 1, wherein
the first end of the elongated extension portion extends beyond the rearward surface of the vehicle cross-car beam.

9. The vehicle airbag support assembly according to claim 1, wherein
the support portion is situated entirely beyond the forward surface of the vehicle cross-car beam.

10. The vehicle airbag support assembly according to claim 1, wherein
the support portion defines an opening that is configured to receive a portion of the airbag device therein, the opening having a central axis that extends at an acute angle relative to a horizontal plane toward the rearward direction of the vehicle.

11. The vehicle airbag support assembly according to claim 1, wherein
the mounting portion includes a mounting structure that includes the lateral extensions and defines a plurality of mounting apertures that are disposed on opposite sides of the elongated extension portion, each of the mounting apertures having a respective center axis that projects toward the second end of the elongated extension portion.

12. The vehicle airbag support assembly according to claim 1, further comprising
a mounting bracket that couples the mounting portion of the airbag support structure to the vehicle cross-car beam, the mounting bracket at least partially conforming to a radial contour of the vehicle cross-car beam.

13. A vehicle airbag support structure comprising:
a mounting portion configured to be fixedly coupled to a rearward surface of a vehicle cross-car beam that faces a rearward direction of a vehicle;
an elongated extension portion having a first end fixedly coupled to the mounting portion and a second end spaced from the first end such that, with the vehicle airbag support structure in an installed position, the first end is situated closer to the rearward surface than a forward surface of the vehicle cross-car beam that faces a forward direction of the vehicle and the second end of the extension portion extends beyond the forward surface, the mounting portion including a plurality of support flanges that extend from an upper surface of the elongated extension portion toward the vehicle cross-car beam and have curved edges that at least partially correspond to a radial contour of the vehicle cross-car beam; and
a support portion configured to support an airbag device, the support portion being fixedly coupled to the second end of the extension portion such that the support portion is situated closer to the forward surface of the vehicle cross-car beam than the rearward surface and is cantilevered with respect to the mounting portion;
the mounting portion including a mounting structure that defines a plurality of mounting apertures that are disposed on opposite sides of the elongated extension portion, each of the mounting apertures having a respective center axis that projects toward the second end of the elongated extension portion, and each of the support flanges further extending along a direction of the respective center axis of a respective one of the mounting apertures toward the support portion.

14. The vehicle airbag support structure according to claim 13, wherein
the elongated extension portion extends substantially perpendicular to a plane of the mounting portion.

15. The vehicle airbag support structure according to claim 13, wherein
the support portion is situated entirely beyond the forward surface of the vehicle cross-car beam.

16. A vehicle airbag support structure comprising:
a mounting portion configured to be fixedly coupled to a rearward surface of a vehicle cross-car beam that faces a rearward direction of a vehicle;
an elongated extension portion having a first end fixedly coupled to the mounting portion and a second end spaced from the first end such that, with the vehicle airbag support structure in an installed position, the first end is situated closer to the rearward surface than a forward surface of the vehicle cross-car beam that faces a forward direction of the vehicle, and the second end of the extension portion extends beyond the forward surface; and
a support portion fixedly coupled to the second end of the extension portion such that the support portion is situated closer to the forward surface of the vehicle cross-car beam than the rearward surface and is cantilevered with respect to the mounting portion, the support portion having a support surface configured to position and support an airbag device such that a direction of deployment of the airbag device is normal to the support surface and toward the rearward direction of the vehicle, the support portion and the elongated extension portion being coplanar.

17. The vehicle airbag support structure according to claim 16, wherein
the support portion defines an opening that is configured to receive a portion of the airbag device therein, the opening having a central axis that extends at an acute angle relative to a horizontal plane toward the rearward direction of the vehicle.

18. The vehicle airbag support structure according to claim 16, wherein
the elongated extension portion extends substantially perpendicular to a plane of the mounting portion.

19. The vehicle airbag support assembly according to claim 1, wherein
a portion of the cross-car beam is disposed between the lateral extensions and the support portion.

20. The vehicle airbag support structure according to claim 16, wherein the support portion is situated entirely beyond the forward surface of the vehicle cross-car beam.

* * * * *